US010635319B2

(12) United States Patent
Du et al.

(10) Patent No.: US 10,635,319 B2
(45) Date of Patent: *Apr. 28, 2020

(54) CONTROL OF STORAGE OF DATA IN A HYBRID STORAGE SYSTEM

(71) Applicant: Alibaba Group Holding Limited, Grand Cayman (KY)

(72) Inventors: Huabing Du, Hangzhou (CN); Yangjun Ma, Hangzhou (CN); Zhenkun Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/021,932

(22) Filed: Jun. 28, 2018

(65) Prior Publication Data

US 2018/0307413 A1 Oct. 25, 2018

Related U.S. Application Data

(63) Continuation of application No. 14/554,692, filed on Nov. 26, 2014.

(30) Foreign Application Priority Data

Nov. 27, 2013 (CN) .......................... 2013 1 0618239

(51) Int. Cl.
*G06F 3/06* (2006.01)

(52) U.S. Cl.
CPC .............. *G06F 3/061* (2013.01); *G06F 3/068* (2013.01); *G06F 3/0647* (2013.01); *G06F 3/0649* (2013.01); *G06F 3/0685* (2013.01)

(58) Field of Classification Search
None
See application file for complete search history.

(56) References Cited

U.S. PATENT DOCUMENTS 6,412,080 B1 * 6/2002 Fleming .............. G06F 12/0246
711/103
8,375,187 B1 * 2/2013 Chilton .................. G06F 3/061
711/114
(Continued)

FOREIGN PATENT DOCUMENTS

CN 101907978 A 12/2010
CN 102831088 A 12/2012
(Continued)

OTHER PUBLICATIONS

Office action for U.S. Appl. No. 14/554,692, dated Jan. 17, 2017, Du et al., "Hybrid Storage," 20 pages.
(Continued)

*Primary Examiner* — Reginald G Bragdon
*Assistant Examiner* — Aaron D Ho
(74) *Attorney, Agent, or Firm* — Lee & Hayes, P.C.

(57) ABSTRACT

Example control methods of hybrid storage are provided, which are applied to each HDD-type storage device and each SSD-type storage device in a storage system having one or more HDD-type storage devices and one or more SSD-type storage devices. Each HDD-type storage device in the storage system is connected to the SSD-type storage device. Each HDD-type storage device and each SSD-type storage device stores one or more data blocks respectively. Access information of each data block stored in a storage device is periodically acquired. A storage location of each data block in the storage system is adjusted according to the acquired access information of each data block. By using the technical solution of the present disclosure, the storage location of the data block is dynamically configured according to an access frequency so that advantages of different storage devices are fully utilized.

16 Claims, 4 Drawing Sheets

(56) References Cited

U.S. PATENT DOCUMENTS

| | | |
|---|---|---|
| 8,843,459 B1 | 9/2014 | Aston et al. |
| 9,319,464 B2 | 4/2016 | Musial et al. |
| 2007/0083697 A1* | 4/2007 | Birrell .................. G06F 12/0246 711/103 |
| 2008/0005462 A1 | 1/2008 | Pyeon et al. |
| 2008/0154985 A1 | 6/2008 | Childs et al. |
| 2009/0303632 A1* | 12/2009 | Bougaev .............. G11B 19/209 360/73.01 |
| 2010/0082765 A1 | 4/2010 | Murase |
| 2010/0250627 A1* | 9/2010 | Tabata ................ G06F 16/1734 707/812 |
| 2010/0281230 A1 | 11/2010 | Rabii et al. |
| 2011/0078112 A1 | 3/2011 | Takata et al. |
| 2011/0238887 A1 | 9/2011 | Bazzani |
| 2011/0295716 A1 | 12/2011 | Dumon et al. |
| 2011/0320690 A1 | 12/2011 | Petersen et al. |
| 2012/0057407 A1 | 3/2012 | Montgomery et al. |
| 2012/0066712 A1 | 3/2012 | Schultz |
| 2012/0072656 A1 | 3/2012 | Archak et al. |
| 2012/0117297 A1 | 5/2012 | Ish |
| 2012/0159112 A1 | 6/2012 | Tokusho et al. |
| 2012/0166712 A1 | 6/2012 | Lary |
| 2012/0166749 A1 | 6/2012 | Eleftheriou et al. |
| 2012/0198151 A1* | 8/2012 | Kato .................... G06F 3/0605 711/114 |
| 2012/0246403 A1 | 9/2012 | McHale et al. |
| 2012/0278569 A1 | 11/2012 | Kawakami et al. |
| 2012/0317355 A1* | 12/2012 | Ishizaki ............... G06F 3/0607 711/114 |
| 2013/0042057 A1 | 2/2013 | Sinclair et al. |
| 2013/0124780 A1 | 5/2013 | Baderdinni et al. |
| 2013/0132340 A1 | 5/2013 | Jing et al. |
| 2013/0159359 A1 | 6/2013 | Kumar et al. |
| 2013/0159597 A1 | 6/2013 | Cheong |
| 2013/0212349 A1 | 8/2013 | Maruyama |
| 2013/0238832 A1 | 9/2013 | Dronamraju et al. |
| 2013/0254483 A1* | 9/2013 | Iida ........................ G06F 3/061 711/117 |
| 2013/0290281 A1* | 10/2013 | Yokoi .................... G06F 3/0608 707/693 |
| 2014/0032837 A1 | 1/2014 | Nagasaki et al. |
| 2014/0075143 A1* | 3/2014 | Matsuya ................ G06F 12/02 711/170 |
| 2014/0195760 A1 | 7/2014 | Iwamitsu et al. |
| 2014/0207956 A1 | 7/2014 | Musial et al. |
| 2014/0297944 A1 | 10/2014 | Abe |
| 2014/0325121 A1 | 10/2014 | Akutsu et al. |
| 2014/0344518 A1 | 11/2014 | Kawaba |
| 2014/0351505 A1 | 11/2014 | Chiu et al. |
| 2014/0351515 A1 | 11/2014 | Chiu et al. |
| 2015/0067285 A1 | 3/2015 | Naruse |
| 2015/0095528 A1 | 4/2015 | Gao et al. |
| 2015/0149709 A1 | 5/2015 | Du et al. |
| 2015/0199129 A1* | 7/2015 | Nair ........................ G06F 3/064 711/114 |
| 2015/0220280 A1 | 8/2015 | Ishizaki |
| 2015/0286436 A1 | 10/2015 | Olson et al. |
| 2016/0085696 A1 | 3/2016 | Chiu et al. |
| 2016/0132433 A1 | 5/2016 | Hayashi et al. |
| 2016/0253114 A1 | 9/2016 | Deguchi |

FOREIGN PATENT DOCUMENTS

| | | |
|---|---|---|
| CN | WO2013159619 A1 | 10/2013 |
| JP | 2011209973 A | 10/2011 |
| JP | 2011233009 A | 11/2011 |
| JP | 2012038212 A | 2/2012 |
| KR | 20130070178 A | 6/2013 |

OTHER PUBLICATIONS

Office action for U.S. Appl. No. 14/554,692, dated Mar. 3, 2016, Du et al., "Hybrid Storage," 21 pages.

Office action for U.S. Appl. No. 14/554,692, dated May 12, 2017, Huabing Du, "Hybrid Storage," 21 pages.

Office action for U.S. Appl. No. 14/554,692, dated Jun. 16, 2016, Du et al., "Hybrid Storage," 19 pages.

Office Action for U.S. Appl. No. 14/554,692, dated Aug. 29, 2017, Du, "Hybrid Storage," 23 pages.

Office action for U.S. Appl. No. 14/554,692, dated Sep. 16, 2016, Huabing Du, "Hybrid Storage," 20 pages.

PCT Search Report and Written Opinion dated Feb. 18, 2015 for PCT Application No. PCT/US14/67632, 11 pages.

Chinese Second Office Action dated Dec. 22, 2017 for Chinese patent applicaton No. 201310618239.0, counterpart foreign application of U.S. Appl. No. 14/554,692, 8 pages.

Chinese First Office Action dated Apr. 6, 2017 for Chinese patent applicaton No. 201310618239.0, a counterpart foreign application of U.S. Appl. No. 14/554,692, 7 pages.

Chinese Search Report dated Mar. 22, 2017 for Chinese Patent Applicaiton No. 2013106182390, 2 pages.

Chinese Office Action dated Oct. 8, 2018 for Chinese patent application No. 201310618239.0, a counterpart foreign application of U.S. Appl. No. 14/554,692, 9 pages.

Japanese Office Action dated Nov. 6, 2018 for Japanese Application No. 2016-525525, a counterpart of U.S. Pat. No. 10,048,872, 11 pages.

Machine translation of second Chinese Office Action dated Dec. 22, 2017, for Chinese patent application No. 201310618239.0, a counterpart foreign application of U.S. Appl. No. 16/021,932, 8 pages.

Chinese Search Report dated Dec. 13, 2017 for Chinese Patent Applicaiton No. 2013106182390, 1 pages.

Korean Office Action dated Jun. 24, 2019 for Korean Patent Application No. 2016-7013323, a counterpart of U.S. Pat. No. 10,048,872, 14 pages.

European Office Action dated Sep. 5, 2019 for European Patent Application No. 14820988.5, a counterpart of U.S. Pat. No. 10,048,872, 5 pages.

Japanese Office Action dated Jul. 23, 2019 for Japanese Patent Application No. 2016-525525, a counterpart of U.S. Pat. No. 10,048,872, 7 pages.

* cited by examiner

CONTROL OF STORAGE OF DATA IN A HYBRID STORAGE SYSTEM

CROSS REFERENCE TO RELATED PATENT APPLICATION

This application is a continuation of and claims priority to U.S. patent application Ser. No. 14/554,692 filed on Nov. 26, 2014 which claims foreign priority to Chinese Patent Application No. 201310618239.0 filed on 27 Nov. 2013, entitled "HYBRID STORAGE CONTROLLING METHOD AND HYBRID STORAGE SYSTEM," which is hereby incorporated by reference in its entirety.

TECHNICAL FIELD

The present disclosure relates to the field of data storage, and, more particularly, to a controlling method for hybrid storage and a system for hybrid storage.

BACKGROUND

Recently, hybrid storage technology has become a trend. The hybrid storage refers to multiple different storage devices that are combined into a storage system according to a certain strategy based on different properties of different storage devices. Generally, the hybrid storage system may achieve a better system performance than a single storage system. For example, a random storage part of a central processing unit (CPU) may include a level 1 cache (L1 Cache), a level 2 cache (L2 Cache), a level 3 cache (L3 Cache), and a main storage device (main memory). Data access speeds of these storage devices gradually decrease while the capacities thereof gradually increase. According to certain cache coherence mechanisms, a large amount of data access may be performed at a cache having smaller capacity and faster speed, thereby improving an overall system performance.

The existing hybrid storage technologies mainly include a hybrid hard disk technology, a flashcache technology, etc.

The hybrid hard disk technology is directed to a hard disk in which a hybrid hard disk drive (HDD) directly integrated with a certain size solid state drive (SSD) and a technology for combining the SSD and the HDD controlled by a hard disk controller. The HDD generally has a large capacity with a slow data access speed, and the SSD generally has a small capacity with a fast data access speed. A ratio of SSD to HDD is generally fixed so that the hybrid hard disk technology is not effectively adapted to different scenarios to achieve an optimal cost performance ratio.

The flashcache technology adds a new cache layer between a virtual file system (VFS) and a device driver to implement caching popular data. The flashcache technology generally uses SSD as the media for cache (in contrast, internal memory is generally used as the cache), cache popular data from a conventional hard disk to the SSD, and uses an excellent reading performance of SSD to accelerate the system.

The hybrid hard disk technology and the flashcache technology are both hybrid mechanisms based on a single device. The single device has complex configuration and poor flexibility. Moreover, along with the development of distributed storage technology, the hybrid storage technology is also desired at a cluster level. However, the existing hybrid storage technology fails to be implemented at the cluster level.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-executable instructions as permitted by the context above and throughout the present disclosure.

A primary objective of the present disclosure is to provide a control method of hybrid storage and a hybrid storage system to solve problems in the existing technologies.

The present disclosure provides an example control method of hybrid storage, which is applied to one or more HDD-type storage devices and one or more SSD-type storage devices in a storage system having one or more HDD-type storage devices and one or more SSD-type storage devices. For example, each HDD-type storage device in the storage system is connected to the SSD-type storage device. Each HDD-type storage device and each SSD-type storage device stores one or more data blocks respectively. The example method may include the following operations. Access information of each data block stored in a storage device is periodically acquired. A storage location of each data block in the storage system is adjusted according to the acquired access information of each data block.

According to an example embodiment of the present disclosure, the example method may further include recording access information of each data block. The access information may include at least a number of accesses to the data block.

According to an embodiment of the present disclosure, the storage location of each data block in the storage system is adjusted according to the acquired access information of each data block, which may include the following operations. A data block, whose number of accesses exceeds a first predetermined number of times, stored in the HDD-type storage device is migrated to a SSD-type storage device in the storage system for storage. For instance, such SSD-type storage device may be randomly selected. Alternatively, a data block, whose number of accesses is less than a second predetermined number of times, stored in the SSD-type storage device is migrated to a HDD-type storage device in the storage system for storage. For instance, such HDD-type storage device may be randomly selected.

According to an example embodiment of the present disclosure, the data block, whose number of accesses exceeds a first predetermined number of times, stored in the HDD-type storage device is migrated to a random SSD-type storage device in the storage system for storage, which may include the following operations. The data block, whose number of accesses exceeds the first predetermined number of times, stored in the HDD-type storage device is copied to a random SSD-type storage device in the storage system. The data block is deleted from the HDD-type storage device originally storing the data block. The data block, whose number of accesses is less than a second predetermined number of times, stored in the SSD-type storage device is migrated to a random HDD-type storage device in the storage system for storage, which may include the following operations. The data block, whose number of accesses is less than the second predetermined number of times, stored in the SSD-type storage device is copied to a random HDD-type storage device in the storage system. The data block is deleted from the SSD-type storage device originally storing the data block.

The present disclosure also provides an example hybrid storage system, which may include one or more HDD-type storage device and one or more SSD-type storage device. Each HDD-type storage device includes an HDD-type storage unit and a control unit. Each SSD-type storage device includes an SSD-type storage unit and a control unit. The HDD-type storage unit and the SSD-type storage unit store one or more data blocks. The control unit includes an access information acquiring module that periodically acquires access information of each data block stored in the HDD-type storage unit or the SSD-type storage unit and a storage location adjusting module that adjusts the storage location of each data block in the storage system according to the acquired access information of the each data block.

According to an example embodiment of the present disclosure, the control unit may further include a recording module that records the access information of each data block stored in the HDD-type storage unit or the SSD-type storage unit. The access information may include at least the number of accesses to the data block.

According to an example embodiment of the present disclosure, the storage location adjusting module may further migrate a data block, whose number of accesses exceeds a first predetermined number of times, stored in the HDD-type storage unit of the HDD-type storage device to the SSD-type storage unit of a random SSD-type storage device in the storage system for storage. The storage location adjusting unit may further migrate a data block, whose number of accesses is less than a second predetermined number of times, stored in the SSD-type storage unit of the SSD-type storage device to the HDD-type storage unit of a random HDD-type storage device in the storage system for storage.

According to an example embodiment of the present disclosure, the storage location adjusting module may further copy the data block, whose number of accesses exceeds the first predetermined number of times, stored in the HDD-type storage unit of the HDD-type storage device to the SSD-type storage unit of the random SSD-type storage device in the storage system, and delete the data block from the HDD-type storage unit of the HDD-type storage device originally storing the data block. The storage location adjusting module may further copy the data block, whose number of accesses is less than the second predetermined number of times, stored in the SSD-type storage unit of the SSD-type storage device to the HDD-type storage unit of the random HDD-type storage device in the storage system, and delete the data block from the SSD-type storage unit of the SSD-type storage device originally storing the data block.

Compared with the existing technologies, the present techniques take advantage of different storage devices and dynamically configure the storage location of the data block according to an access frequency, thereby achieving performance optimization in terms of storage capacity and data operation speed.

BRIEF DESCRIPTION OF THE DRAWINGS

The drawings herein are used for further understanding of the present disclosure and are a part of the present disclosure. The example embodiments and their descriptions of the present disclosure are used for illustrating instead of limiting the present disclosure.

DETAILED DESCRIPTION

The present techniques may only need to configure HDD-type and SSD-type storage devices to implement and optimize hybrid storage of data.

To clearly describe the objectives, technical solutions, and advantages of the present disclosure, a detailed description is given below to describe the technical solutions of the present disclosure by reference to the example embodiments and corresponding FIGs of the present disclosure. Apparently, the illustrated example embodiments only represent part instead of all of the embodiments of the present disclosure. All of the other embodiments obtained by one of ordinary skill in the art on the basis of the embodiments of the present disclosure without making inventive effort shall be within the scope of protection of the present disclosure.

According to an example embodiment of the present disclosure, the present disclosure provides an example control method of hybrid storage, which may be applied to each HDD-type storage device and each SSD-type storage device in a storage system having one or more HDD-type storage devices and one or more SSD-type storage devices. Each HDD-type storage device in the storage system is connected to the SSD-type storage device. Each HDD-type storage device and each SSD-type storage device stores one or more data blocks respectively. The data block refers to a data unit transmitted between storage devices.

It should be understood that, in the storage system, the HDD-type storage device and the SSD-type storage device are separate computing nodes. In other words, each computing node only includes one type of storage medium. For example, if a certain computing node (storage device) includes a HDD-type storage unit, the computing node (storage device) does not include a SSD-type storage unit, so that the computing node is a HDD-type storage device. Similarly, if a certain computing node (storage device) includes a SSD-type storage unit, the computing node (storage device) does not include a HDD-type storage unit, so that the computing node is a SSD-type storage device.

In other words, the HDD-type storage device only includes HDD (mechanical hard drive) and the SSD-type storage device only includes SSD (solid state hard drive). The one or more HDD-type storage devices may be HDD-type storage devices with the same size and the one or more SSD-type storage devices may be SSD-type storage devices with the same size. That is, all of the HDD-type storage devices may be the same, and all of the SSD-type storage devices may be the same. Certainly, it should be understood that the one or more HDD-type storage devices may be HDD-type storage devices with different sizes, and the one or more SSD-type storage devices may be SSD-type storage devices with different sizes.

Figure 1:
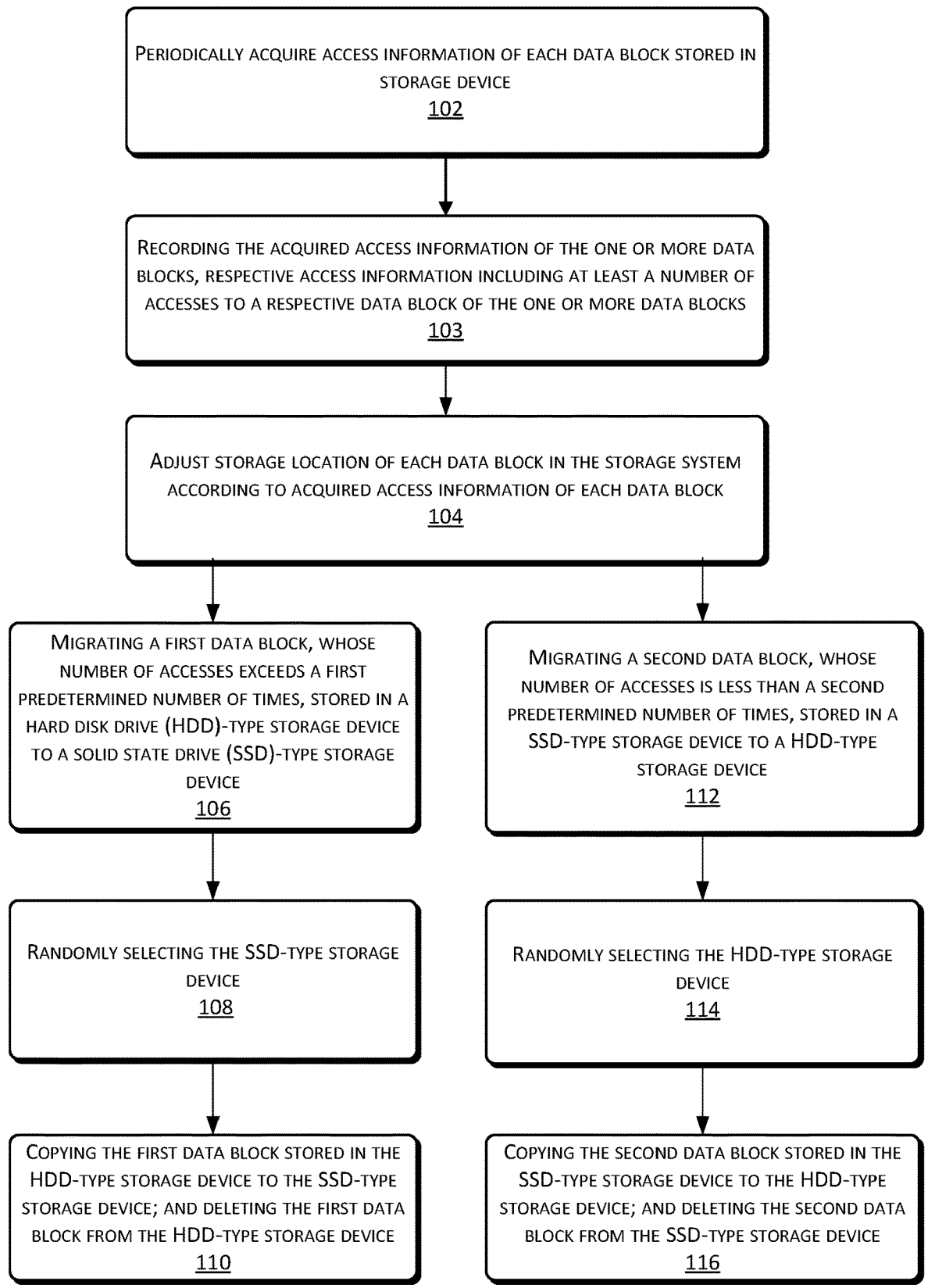
FIG. 1 is a flow chart of an example control method of hybrid storage according to an example embodiment of the present disclosure.

Referring to FIG. 1, FIG. 1 is a flow chart of an example control method of hybrid storage according to an example embodiment of the present disclosure. As shown in FIG. 1, with respect to one or more storage devices of the storage system, the following operations may be performed.

At step 102, access information of each data block stored in the storage device is periodically acquired. The access information may at least include a number of accesses to the data block. In other words, the number of accesses to each data block stored in the HDD or the SSD-type storage device is acquired after every predetermined period. For example, data may be divided into data blocks at a megabyte (MB, MByte) level, such as data blocks of several MBytes, to avoid excessive meta information, and save storage space. The access information may further include the meta information of the data block such as a storage location of the data block.

According to an example embodiment of the present disclosure, the example method may further include a step, 103, of recording the access information of each stored data block. That is, the number of accesses to each stored data block is counted and recorded. During recording, the access information of each data block may be recorded asynchronously. That is, access information of more than two data blocks may be recorded separately at the same time. For example, when access information of one data block is recorded, if another data block is also accessed, access information of another data block may be counted and recorded at the same time.

At step 104, the storage location of each data block in the storage system is adjusted according to the acquired access information of each data block.

For example, at steps 106 and 108, a data block, whose number of accesses exceeds a first predetermined number of times, stored in the HDD-type storage device is migrated (106) to a randomly selected (108) SSD-type storage device in the storage system for storage. Alternatively, at steps 112 and 114, a data block, whose number of accesses is less than a second predetermined number of times, stored in the SSD-type storage device is migrated (112) to a randomly selected (114) HDD-type storage device in the storage system for storage.

The HDD device generally has a larger capacity with a slower data access speed, while the SSD device generally has a smaller capacity with a faster data access speed. Thus, if the storage device is the HDD-type device, the data block having high access frequency (whose number of accesses exceeds the first predetermined number of times) is migrated to the random SSD-type storage device in the storage system for storage, thereby improving the speed of reading the data block having high access frequency. If the storage device is the SSD-type storage device, a data block having low access frequency (whose number of accesses is less than the second predetermined number of times) is migrated to a random HDD-type storage device in the storage system for storage. Therefore, a device in which the data block is stored in the storage system may be adjusted according to the number of accesses to the data block, thereby implementing the maximum optimization of the storage system performance.

According to the above technical solutions, the storage system only needs to be configured with two types of storage devices, i.e., one or more HDD-type storage devices and one or more SSD-type storage devices. An appropriate respective number of the two types of storage devices is configured according to requirements of general scenarios or applications. The number of accesses to each data block stored in each storage device is acquired periodically to migrate a data block having frequent accesses to the SSD-type storage device having faster reading speed for storage and to migrate a data block having infrequent accesses to the HDD-type storage device having large capacity for storage, thereby fully taking advantages of different types of devices and achieving performance balance in terms of storage capacity and data operation speed.

According to an example embodiment of the present disclosure, migrating a data block from a storage device (an original storage device) to another storage device (a target storage device) may including copying the data block to the target storage device and deleting the data block from the original storage device, thereby achieving migration.

In other words, the data block, whose number of accesses exceeds a first predetermined number of times, stored in the HDD-type storage device is migrated to a random SSD-type storage device in the storage system for storage, which may include the following operations. The data block, whose number of accesses exceeds the first predetermined number of times, stored in the HDD-type storage device is copied at step 110 to a random SSD-type storage device in the storage system. The data block is deleted at step 110 from the HDD-type storage device originally storing the data block. The data block, whose number of accesses is less than a second predetermined number of times, stored in the SSD-type storage device is migrated to a random HDD-type storage device in the storage system for storage, which may include the following operations. The data block, whose number of accesses is less than the second predetermined number of times, stored in the SSD-type storage device is copied at step 116 to a random HDD-type storage device in the storage system. The data block is deleted at step 116 from the SSD-type storage device originally storing the data block.

Figure 2:
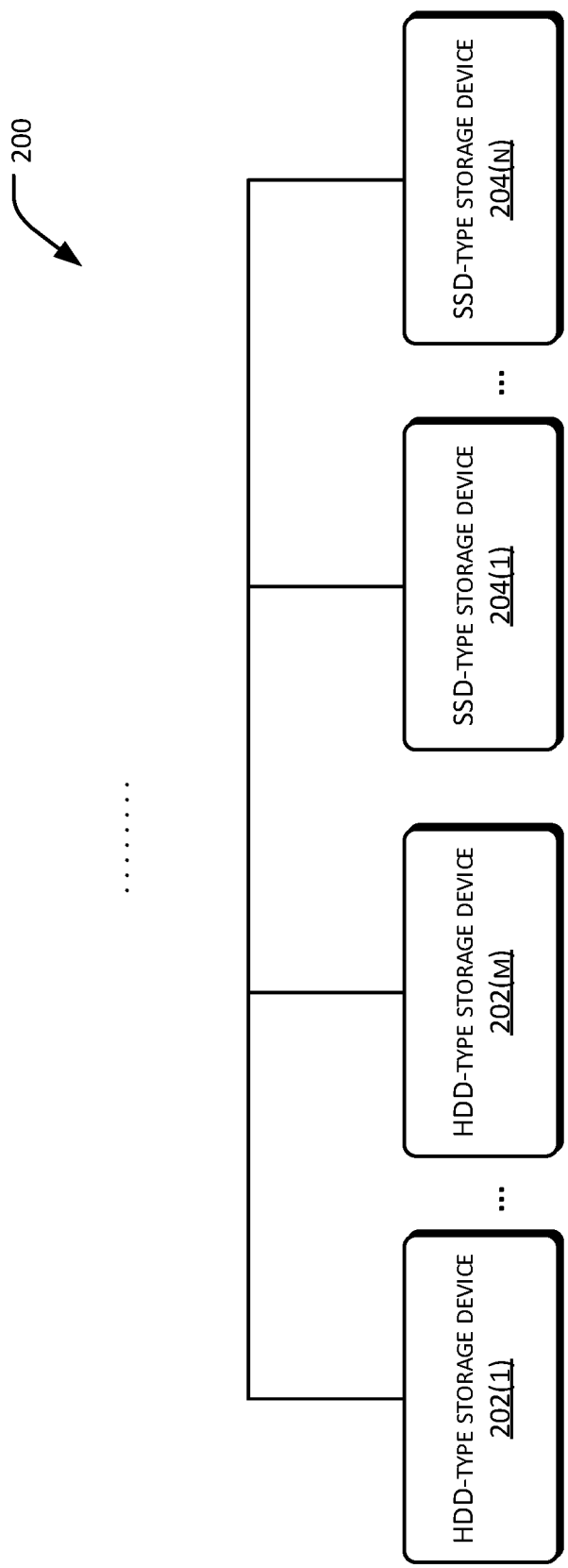
FIG. 2 is a structural block diagram of an example hybrid storage system according to an example embodiment of the present disclosure.

The present disclosure further provides an example hybrid storage system. FIG. 2 is a structural block diagram of an example hybrid storage system 200 according to an example embodiment of the present disclosure. According to an example embodiment of the present disclosure, the hybrid storage system 200 may include one or more HDD-type storage devices 202 (1), . . . , 202(M) and one or more SSD-type storage devices 204(1), . . . , 204(N), M and N may be any integer.

Figure 3A:
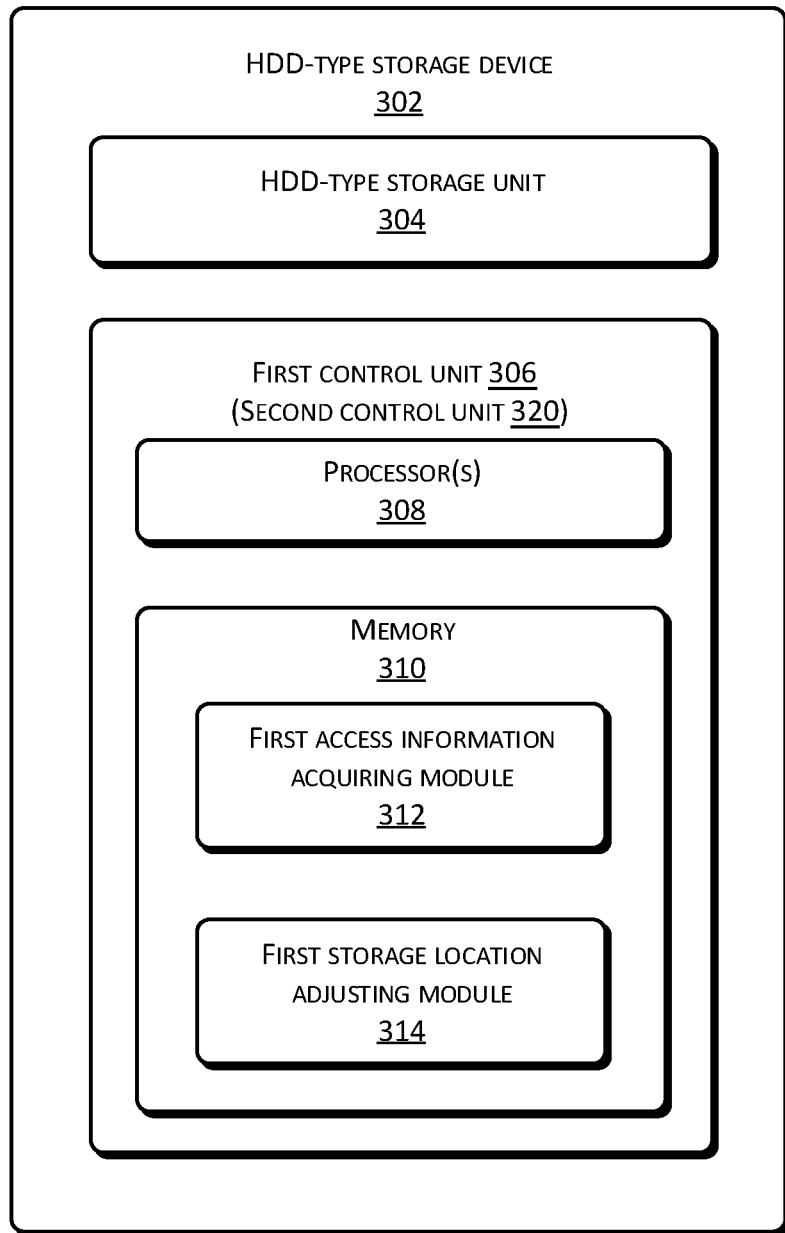
FIG. 3A is a structural block diagram of an example HDD-type storage device in an example hybrid storage system according to an example embodiment of the present disclosure.
Figure 3B:
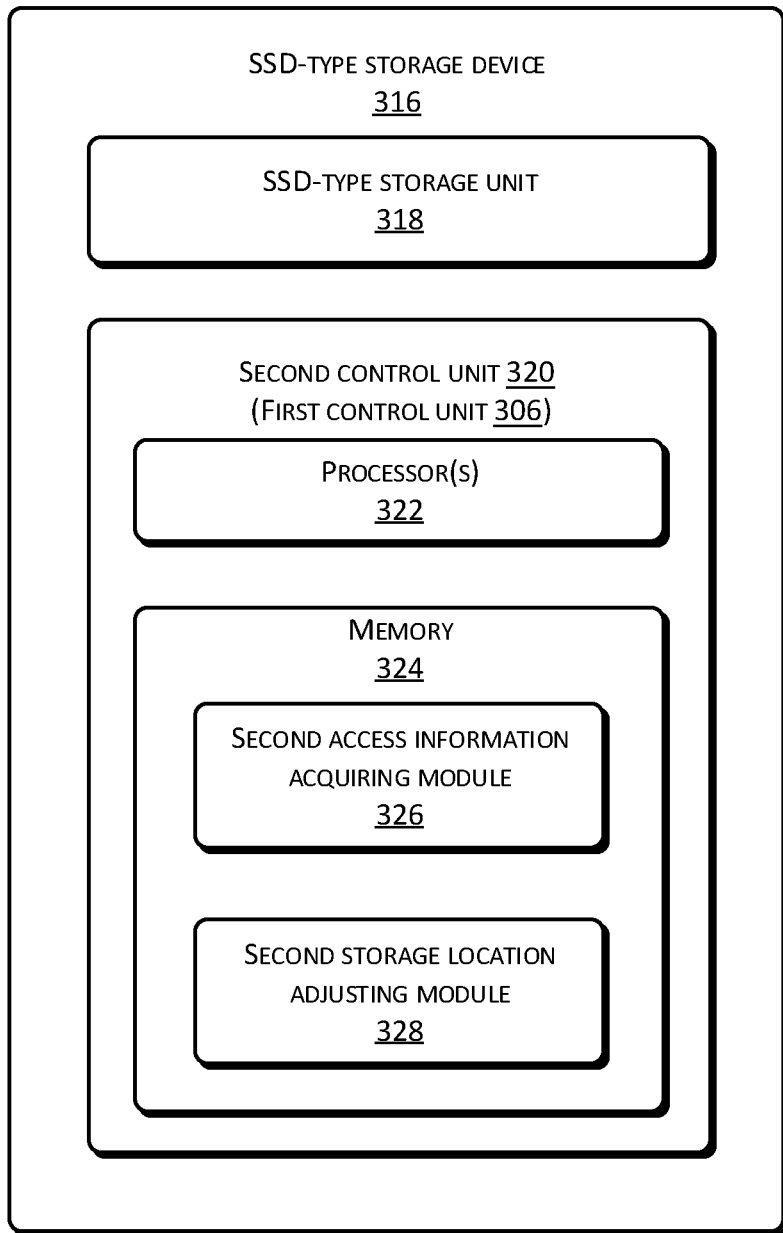
FIG. 3B is a structural block diagram of an example SSD-type storage device in an example hybrid storage system according to an example embodiment of the present disclosure.

In order to describe the structure of each storage device more clearly, FIG. 3A and FIG. 3B show structural block diagrams of an example HDD-type storage device and an example SSD-type storage device in a hybrid storage system according to an example embodiment of the present disclosure respectively. As shown in FIG. 3A, an example HDD-type storage device 302 may include a HDD-type storage unit 304 and a control unit of the HDD-type storage unit (or a first control unit) 306. The first control unit 306 may be hardware, software, or a combination thereof. For example, in FIG. 3A, the first control unit 306 may include one or more processor(s) 308 or data processing unit(s) and memory 310. The memory 310 is an example of computer-readable media. The memory 310 may store therein a plurality of modules including a first access information acquiring module 312 and a first storage location adjusting module 314.

As shown in FIG. 3B, an example SSD-type storage device 316 may include a HDD-type storage unit 318 and a control unit of the SSD-type storage unit (or a second control unit) 320. The second control unit 320 may be hardware, software, or a combination thereof. For example, in FIG. 3B, the second control unit 320 may include one or more processor(s) 322 or data processing unit(s) and memory 324.

The memory 324 is an example of computer-readable media. The memory 324 may store therein a plurality of modules including a second access information acquiring module 326 and a second storage location adjusting module 328.

For example, the control unit of the HDD-type storage unit or the first control unit 306 and the control unit of the SSD-type storage unit or the second control unit 320 may be the same unit, belong to the same unit, or refer to a same control unit. That is, the first access information acquiring module 312 and the second access information acquiring module 326 may be the same or refer to a same module. The first storage location adjusting module 314 and the second storage location adjusting module 328 may be the same or refer to a same module.

For another example, the control unit of the HDD-type storage unit or the first control unit 306 and the control unit of the SSD-type storage unit or the second control unit 320 may be different or refer to distinctive units.

The structures of the HDD-type storage device 302 and the SSD-type storage device 316 may be the same as those described above, and are not repeated herein.

The HDD-type storage unit 304 and the SSD-type storage unit 318 may store one or more data blocks.

The first access information acquiring module 312 periodically acquires access information of each data block stored in the HDD-type storage unit 304. The second access information acquiring module 326 periodically acquires access information of each data block stored in the SSD-type storage unit 318.

The first storage location adjusting module 314 adjusts the storage location of each data block in the storage system according to the acquired access information of the each data block. The second storage location adjusting module 328 also adjusts the storage location of each data block in the storage system according to the acquired access information of the each data block.

The first control unit 306 may also include a first recording module (not shown in the FIGs) stored in memory 310 and the second control unit 320 may also include a second recording module (not shown in the FIGs) stored in memory 324. The first recording module or the second recording module records the access information of each data block stored in the HDD-type storage unit 304 or the SSD-type storage unit 318 respectively. The access information may include at least the number of accesses to the data block.

With respect to the HDD-type storage unit 304 of the HDD-type storage device 302, the first storage location adjusting module 314 may further migrate a data block, whose number of accesses exceeds a first predetermined number of times, stored in the HDD-type storage unit 304 of the HDD-type storage device 302 to a SSD-type storage unit of a random SSD-type storage device such as the SSD-type storage unit 318 of the SSD-type storage device 316 in the storage system for storage.

With respect to the SSD-type storage unit 318 of the SSD-type storage device 316, the second storage location adjusting module 328 may further migrate a data block, whose number of accesses is less than a second predetermined number of times, stored in the SSD-type storage unit 318 of the SSD-type storage device 316 to a HDD-type storage unit of a random HDD-type storage device such as the HDD-type storage unit 304 of the HDD-type storage device 302 in the storage system for storage.

With respect to the HDD-type storage unit 304 of the HDD-type storage device 302, the first storage location adjusting module 314 may further copy the data block, whose number of accesses exceeds the first predetermined number of times, stored in the HDD-type storage unit 304 of the HDD-type storage device 302 to the SSD-type storage unit of the random SSD-type storage device such as the SSD-type storage unit 318 of the SDD-type storage device 316 in the storage system for storage, and delete the data block from the HDD-type storage unit 304 of the HDD-type storage device 302 originally storing the data block.

With respect to the SSD-type storage unit 318 of the SSD-type storage device 316, the second storage location adjusting module 328 may further copy the data block, whose number of accesses is less than the second predetermined number of times, stored in the SSD-type storage unit 318 of the SSD-type storage device 316 to the HDD-type storage unit of the random HDD-type storage device such as the HDD-type storage unit 304 of the random HDD-type storage device 302 in the storage system for storage, and delete the data block from the SSD-type storage unit 318 of the SSD-type storage device 316 originally storing the data block.

The functions implemented by the system of the example device embodiments generally correspond to those operations in the example method embodiment as shown in FIG. 1. Thus, any details not described in the description of the example device embodiments may refer to related illustrations in the above example method embodiment, which are not detailed herein.

In a standard configuration, a computing device or system as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the element.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

What is claimed is:

1. A method comprising:
    dividing data into a plurality of data blocks, a data block of the plurality of data blocks being transmitted between storage devices;
    storing the plurality of data blocks in one or more storage devices;
    periodically acquiring access information of one or more data blocks of the plurality of data blocks stored in the one or more storage devices, the access information including access frequency; and
    adjusting one or more storage locations of the one or more data blocks according to the access frequency in the acquired access information of the one or more data blocks by:
        randomly selecting a solid state drive (SSD)-type storage device, and
        migrating a first data block, whose number of accesses exceeds a first predetermined number of accesses, stored in a hard disk drive (HDD)-type storage device to the randomly selected SSD-type storage device.

2. The method of claim 1, further comprising recording the acquired access information of the one or more data blocks, respective access information including at least a number of accesses to a respective data block of the one or more data blocks.

3. The method of claim 2, wherein the migrating the first data block comprises:
    copying the first data block stored in the HDD-type storage device to the SSD-type storage device; and
    deleting the first data block from the HDD-type storage device.

4. The method of claim 1, wherein the adjusting the one or more storage locations of the one or more data blocks in the storage system according to the access frequency in the acquired access information of the one or more data blocks comprises:
    migrating a second data block, whose number of accesses is less than a second predetermined number of accesses, stored in a SSD-type storage device to a HDD-type storage device.

5. The method of claim 4, further comprising randomly selecting the HDD-type storage device.

6. The method of claim 4, wherein the migrating the second data block comprises:
    copying the second data block stored in the SSD-type storage device to the HDD-type storage device; and
    deleting the second data block from the SSD-type storage device.

7. A storage system comprising:
    one or more solid state drive (SSD)-type storage devices; and
    one or more hard disk drive (HDD)-type storage device, a respective HDD-type storage device of the one or more HDD-type storage devices including:
        one or more HDD-type storage units; and
        a first control unit including:
            one or more first control unit processors;
            a first access information acquiring module executable by the one or more first control unit processors for acquiring first access information of one or more data blocks stored in the one or more HDD-type storage units, the one or more data blocks being one or more data blocks of a plurality of data blocks generated from dividing data, a data block of the plurality of data blocks being transmitted between storage devices, the acquired first access information including access frequency; and
            a first storage location adjusting module executable by the one or more first control unit processors for adjusting one or more storage locations of the one or more data blocks stored in the one or more HDD-type storage units according to the access frequency in the acquired first access information of the one or more data blocks stored in the one or more HDD-type storage units, a data access speed of the respective HDD-type storage device, and a data access speed of a respective SSD-type storage device of the one or more SSD-type storage devices by:
                randomly selecting an SSD-type storage device in the storage system, and
                migrating a first data block, whose number of accesses exceeds a first predetermined number of times, stored in a hard disk drive (HDD)-type storage device to the randomly selected SSD-type storage device.

8. The storage system of claim 7, wherein the first control unit further comprises a first recording module executable by the one or more first control unit processors for recording the acquired first access information of the one or more data blocks stored in the one or more HDD-type storage units, respective access information including at least a number of accesses to a respective data block of the one or more data blocks stored in the one or more HDD-type storage units.

9. The storage system of claim 7, wherein the first storage location adjusting module is further executable by the one or more first control unit processors for:
    copying the first data block stored in the HDD-type storage device to the randomly selected SSD-type storage device in the storage system; and
    deleting the first data block from the HDD-type storage device.

10. The storage system of claim 7, wherein a respective SSD-type storage device of the one or more SSD-type storage devices includes:
    one or more SSD-type storage units; and
    a second control unit including:
        one or more second control unit processors;
        a second access information acquiring module executable by the one or more second control unit processors for periodically acquiring second access information of one or more data blocks stored in the one or more SSD-type storage units, the acquired second access information including access frequency and storage location included in meta information of the one or more data blocks stored in the one or more SSD-type storage units; and a second storage location adjusting module executable by the one or more second control unit processors for adjusting one or more storage locations of the one or more data blocks stored in the one or more SSD-type storage units according to the access frequency and the storage location included in the acquired second access information of the one or more data blocks stored in the one or more SSD-type storage units, a data access speed of the respective SSD-type storage device, and a data access speed of a respective HDD-type storage device of the one or more HDD-type storage devices.

11. The storage system of claim 10, wherein the second control unit further comprises a second recording module executable by the one or more second control unit processors for recording the acquired second access information of the one or more data blocks stored in the one or more SSD-type storage units, respective access information including at least a number of accesses to a respective data block of the one or more data blocks stored in the one or more SSD-type storage units.

12. The storage system of claim 10, wherein the second storage location adjusting module is further executable by the one or more second control unit processors for migrating a second data block, whose number of accesses is less than a second predetermined number of times, stored in a SSD-type storage device to a HDD-type storage device in the storage system for storage.

13. The storage system of claim 12, wherein the second storage location adjusting module is further executable by the one or more second control unit processors for randomly selecting the HDD-type storage device.

14. The storage system of claim 12, wherein the second storage location adjusting module is further executable by the one or more second control unit processors for:

copying the second data block stored in the SSD-type storage device to the HDD-type storage device in the storage system; and deleting the second data block from the SSD-type storage device.

15. The storage system of claim 10, wherein the first control unit and the second control unit belong to a same unit.

16. One or more memories stored thereon computer-executable instructions executable by one or more processors to perform operations comprising:

dividing data into a plurality of data blocks, a data block of the plurality of data block being transmitted between storage devices;

storing the plurality of data blocks in one or more storage devices;

periodically acquiring access information of one or more data blocks of the plurality of data blocks stored in the one or more storage devices, the access information including access frequency; and adjusting one or more storage locations of the one or more data blocks in a storage system according to the access frequency in the acquired access information of the one or more data blocks, the adjusting including:

randomly selecting a solid state drive (SSD)-type storage device, and migrating a first data block, whose number of accesses exceeds a first predetermined number of accesses, stored in a hard disk drive (HDD)-type storage device of the one or more storage devices to the randomly selected SSD-type storage device of the one or more storage devices; or migrating a second data block, whose number of accesses is less than a second predetermined number of accesses, stored in a SSD-type storage device of the one or more devices to a HDD-type storage device of the one or more storage devices.

\* \* \* \* \*